(12) United States Patent
Iqbal et al.

(10) Patent No.: US 11,417,011 B2
(45) Date of Patent: Aug. 16, 2022

(54) 3D HUMAN BODY POSE ESTIMATION USING A MODEL TRAINED FROM UNLABELED MULTI-VIEW DATA

(71) Applicant: NVIDIA Corporation, Santa Clara, CA (US)

(72) Inventors: Umar Iqbal, San Jose, CA (US); Pavlo Molchanov, San Jose, CA (US); Jan Kautz, Lexington, MA (US)

(73) Assignee: NVIDIA CORPORATION, Santa Clara, CA (US)

( * ) Notice: Subject to any disclaimer, the term of this patent is extended or adjusted under 35 U.S.C. 154(b) by 220 days.

(21) Appl. No.: 16/897,057

(22) Filed: Jun. 9, 2020

(65) Prior Publication Data

US 2021/0248772 A1    Aug. 12, 2021

Related U.S. Application Data

(60) Provisional application No. 62/975,103, filed on Feb. 11, 2020.

(51) Int. Cl.
*G06T 7/70* (2017.01)
*G06N 5/04* (2006.01)
(Continued)

(52) U.S. Cl.
CPC .............. *G06T 7/70* (2017.01); *G06N 5/04* (2013.01); *G06N 20/00* (2019.01); *G06T 7/50* (2017.01);
(Continued)

(58) Field of Classification Search
CPC ...... G06N 20/00; G06N 3/0454; G06N 3/084; G06N 5/04; G06T 2207/20081;
(Continued)

(56) References Cited

U.S. PATENT DOCUMENTS 9,311,713 B2 * 4/2016 Han .................... G06V 40/113
2007/0080967 A1 * 4/2007 Miller ................. G06V 20/653
345/473

(Continued)

OTHER PUBLICATIONS

Helge Rhodin,( NPL DOC: "Learning Monocular 3D Human Pose Estimation from Multi-view Images," Jun. 2018, Proceedings of the IEEE Conference on Computer Vision and Pattern Recognition (CVPR), 2018, pp. 8437-8446).*

(Continued)

*Primary Examiner* — Omar S Ismail
(74) *Attorney, Agent, or Firm* — Zilka-Kotab, P.C.

(57) ABSTRACT

Learning to estimate a 3D body pose, and likewise the pose of any type of object, from a single 2D image is of great interest for many practical graphics applications and generally relies on neural networks that have been trained with sample data which annotates (labels) each sample 2D image with a known 3D pose. Requiring this labeled training data however has various drawbacks, including for example that traditionally used training data sets lack diversity and therefore limit the extent to which neural networks are able to estimate 3D pose. Expanding these training data sets is also difficult since it requires manually provided annotations for 2D images, which is time consuming and prone to errors. The present disclosure overcomes these and other limitations of existing techniques by providing a model that is trained from unlabeled multi-view data for use in 3D pose estimation.

20 Claims, 8 Drawing Sheets

(51) Int. Cl.
*G06T 7/50* (2017.01)
*G06N 20/00* (2019.01)

(52) U.S. Cl.
CPC ............... *G06T 2207/20081* (2013.01); *G06T 2207/20084* (2013.01); *G06T 2207/30196* (2013.01)

(58) Field of Classification Search
CPC . G06T 2207/20084; G06T 2207/30196; G06T 7/50; G06T 7/70
See application file for complete search history.

(56) References Cited

U.S. PATENT DOCUMENTS

| | | | |
|---|---|---|---|
| 2007/0217676 A1* | 9/2007 | Grauman | G06V 10/462 382/190 |
| 2019/0278983 A1 | 9/2019 | Iqbal et al. | |
| 2019/0371080 A1* | 12/2019 | Sminchisescu | G06T 13/40 |
| 2020/0005538 A1* | 1/2020 | Neeter | G06T 7/73 |
| 2020/0184668 A1* | 6/2020 | Rad | G06N 3/08 |
| 2020/0211206 A1* | 7/2020 | Wang | G06N 3/08 |
| 2020/0279428 A1* | 9/2020 | Guay | G06T 13/40 |
| 2020/0364554 A1* | 11/2020 | Wang | G06T 7/20 |
| 2021/0089762 A1* | 3/2021 | Rahimi | G06K 9/6223 |

OTHER PUBLICATIONS

Jiajun Wu,(NPL Doc:"MarrNet: 3D Shape Reconstruction via 2.5D Sketches," Dec. 9, 2017, 31st Conference on Neural Information Processing Systems (NIPS 2017), Long Beach, CA, USA, pp. 1-8.).*
Wei Yang,( NPL Doc: "3D Human Pose Estimation in the Wild by Adversarial Learning," Jun. 2018, Proceedings of the IEEE Conference on Computer Vision and Pattern Recognition (CVPR), 2018, pp. 5255-5264).*
Bruce Xiaohan Nie( NPL Doc: "Monocular 3D Human Pose Estimation by Predicting Depth on Joints," Oct. 2017, Proceedings of the IEEE International Conference on Computer Vision (ICCV), 2017, pp. 3447-3455).*
Alin-Ionut Popa,"Deep Multitask Architecture for Integrated 2D and 3D Human Sensing," Jul. 2017, Proceedings of the IEEE Conference on Computer Vision and Pattern Recognition (CVPR), 2017, pp. 6293-6296.*
Sam Johnson,"Learning effective human pose estimation from inaccurate annotation," Aug. 22, 2011,CVPR 2011,Conference Date: Jun. 20-25, 2011,10.1109/CVPR.2011.5995318,pp. 1465-1467.*
Zhou et al., "Deep Kinematic Pose Regression," Computer Science, 2016, pp. 1-16, retrieved from https://www.semanticscholar.org/paper/Deep-Kinematic-Pose-Regression-Zhou-Sun/c6499f53402e68ecf4bbd4410cb8816fee3d6398.
Tekin et al., "Structured Prediction of 3D Human Pose with Deep Neural Networks," BMVC, 2016, pp. 1-11, retrieved from http://www.bmva.org/bmvc/2016/papers/paper130/paper130.pdf.
Li et al., "3D Human Pose Estimation from Monocular Images with Deep Convolutional Neural Network," Asian Conference on Computer Vision, 2014, pp. 1-16.
Li et al., "Maximum-Margin Structured Learning with Deep Networks for 3D Human Pose Estimation," ICCV, 2015, pp. 2848-2856, retrieved from https://www.cv-foundation.org/openaccess/content_iccv_2015/papers/Li_Maximum-Margin_Structured_Learning_ICCV_2015_paper.pdf.
Xiao et al., "Simple Baselines for Human Pose Estimation and Tracking," ECCV, 2018, pp. 1-16, retrieved from http://openaccess.thecvf.com/content_ECCV_2018/papers/Bin_Xiao_Simple_Baselines_for_ECCV_2018_paper.pdf.
Sun et al., "Compositional Human Pose Regression," ICCV, 2017, pp. 2602-2611, retrieved from http://openaccess.thecvf.com/content_ICCV_2017/papers/Sun_Compositional_Human_Pose_ICCV_2017_paper.pdf.

Sun et al., "Integral Human Pose Regression," ECCV, 2018, pp. 1-17, retrieved from http://openaccess.thecvf.com/content_ECCV_2018/papers/Xiao_Sun_Integral_Human_Pose_ECCV_2018_paper.pdf.
Ionescu et al., "Human3.6M: Large Scale Datasets and Predictive Methods for 3D Human Sensing in Natural Environments," IEEE Transactions on Pattern Analysis and Machine Intelligence, 2014, pp. 1-15.
Mehta et al., "Monocular 3D Human Pose Estimation in the Wild Using Improved CNN Supervision," International Conference on 3D Vision, 2017, 16 pages, retrieved from https://arxiv.org/abs/1611.09813.
Iqbal et al., "Hand Pose Estimation via Latent 2.5D Heatmap, Regression," ECCV, 2018, pp. 1-17, retrieved from http://jankautz.com/publications/HandPose25D_ECCV18.pdf.
Rhodin et al., "Learning Monocular 3D Human Pose Estimation from Multi-view Images," CVPR, 2018, pp. 8437-8446, retrieved from http://openaccess.thecvf.com/content_cvpr_2018/papers/Rhodin_Learning_Monocular_3D_CVPR_2018_paper.pdf.
Pavlakos et al., "Harvesting Multiple Views for Marker-less 3D Human Pose Annotations," CVPR, 2017, pp. 6988-6997, retrieved from http://openaccess.thecvf.com/content_cvpr_2017/papers/Pavlakos_Harvesting_Multiple_Views_CVPR_2017_paper.pdf.
Kocabas et al., "Self-Supervised Learning of 3D Human Pose using Multi-view Geometry," CVPR, 2019, pp. 1077-1086, retrieved from http://openaccess.thecvf.com/content_CVPR_2019/papers/Kocabas_Self-Supervised_Learning_of_3D_Human_Pose_Using_Multi-View_Geometry_CVPR_2019_paper.pdf.
Yao et al., "MONET: Multiview Semi-supervised Keypoint Detection via Epipolar Divergence," ICCV, 2019, pp. 753-762, retrieved from http://openaccess.thecvf.com/content_ICCV_2019/papers/Yao_MONET_Multiview_Semi-Supervised_Keypoint_Detection_via_Epipolar_Divergence_ICCV_2019_paper.pdf.
Andriluka et al., "2D Human Pose Estimation: New Benchmark and State of the Art Analysis," CVPR, 2014, 8 pages, retrieved from http://openaccess.thecvf.com/content_cvpr_2014/papers/Andriluka_2D_Human_Pose_2014_CVPR_paper.pdf.
Arnab et al., "Exploiting temporal context for 3D human pose estimation in the wild," CVPR, 2019, pp. 3395-3404, retrieved from http://openaccess.thecvf.com/content_CVPR_2019/papers/Arnab_Exploiting_Temporal_Context_for_3D_Human_Pose_Estimation_in_the_CVPR_2019_paper.pdf.
Chen et al., "3D Human Pose Estimation = 2D Pose Estimation + Matching," CVPR, 2017, pp. 7035-7043, retrieved from http://openaccess.thecvf.com/content_cvpr_2017/papers/Chen_3D_Human_Pose_CVPR_2017_paper.pdf.
Chen et al., "Unsupervised 3D Pose Estimation with Geometric Self-Supervision," CVPR, 2019, pp. 5714-5724, retrieved from http://openaccess.thecvf.com/content_CVPR_2019/papers/Chen_Unsupervised_3D_Pose_Estimation_With_Geometric_Self-Supervision_CVPR_2019_paper.pdf.
Dabral et al., "Learning 3D Human Pose from Structure and Motion," ECCV, 2018, pp. 1-16, retrieved from http://openaccess.thecvf.com/content_ECCV_2018/papers/Rishabh_Dabral_Learning_3D_Human_ECCV_2018_paper.pdf.
Drover et al., "Can 3D Pose be Learned from 2D Projections Alone?," ECCVW, 2018, pp. 1-17, retrieved from https://pdfs.semanticscholar.org/664c/f9ac1552fd42a7f7c474f723f9df9d1e28ce.pdf.
Habibie et al., "In the Wild Human Pose Estimation Using Explicit 2D Features and Intermediate 3D Representations," CVPR, 2019, pp. 10905-10914, retrieved from http://openaccess.thecvf.com/content_CVPR_2019/papers/Habibie_In_the_Wild_Human_Pose_Estimation_Using_Explicit_2D_Features_CVPR_2019_paper.pdf.
Hossain et al., "Exploiting temporal information for 3D human pose estimation," ECCV, 2018, pp. 1-17, retrieved from https://eccv2018.org/openaccess/content_ECCV_2018/papers/Mir_Rayat_Imtiaz_Hossain_Exploiting_temporal_information_ECCV_2018_paper.pdf.
Kanazawa et al., "End-to-end Recovery of Human Shape and Pose," CVPR, 2018, pp. 7122-7131, retrieved from http://openaccess.thecvf.com/content_cvpr_2018/papers/Kanazawa_End-to-End_Recovery_of_CVPR_2018_paper.pdf.

(56) References Cited

OTHER PUBLICATIONS

Li et al., "Learning the Depths of Moving People by Watching Frozen People," CVPR, 2019, pp. 4521-4530, retrieved from http://openaccess.thecvf.com/content_CVPR_2019/papers/Li_Learning_the_Depths_of_Moving_People_by_Watching_Frozen_People_CVPR_2019_paper.pdf.

Li et al., "On Boosting Single-Frame 3D Human Pose Estimation via Monocular Videos," ICCV, 2019, pp. 2192-2201, retrieved from http://openaccess.thecvf.com/content_ICCV_2019/papers/Li_On_Boosting_Single-Frame_3D_Human_Pose_Estimation_via_Monocular_Videos_ICCV_2019_paper.pdf.

Luvizon et al., "2D/3D Pose Estimation and Action Recognition using Multitask Deep Learning," CVPR, 2018, pp. 5137-5146, retrieved from http://openaccess.thecvf.com/content_cvpr_2018/papers/Luvizon_2D3D_Pose_Estimation_CVPR_2018_paper.pdf.

Martinez et al., "A simple yet effective baseline for 3d human pose estimation," ICCV, 2017, pp. 2640-2649, retrieved from http://openaccess.thecvf.com/content_ICCV_2017/papers/Martinez_A_Simple_yet_ICCV_2017_paper.pdf.

Mehta et al., "VNect: Real-time 3D Human Pose Estimation with a Single RGB Camera," ACM Transactions on Graphics, vol. 36, No. 4, Jul. 2017, pp. 44:1-44:14.

Moreno-Noguer, F., "3D Human Pose Estimation from a Single Image via Distance Matrix Regression," CVPR, 2017, pp. 2823-2832, retrieved from http://openaccess.thecvf.com/content_cvpr_2017/papers/Moreno-Noguer_3D_Human_Pose_CVPR_2017_paper.pdf.

Novotny et al., "C3DPO: Canonical 3D Pose Networks for Non-Rigid Structure From Motion," ICCV, 2019, pp. 7688-7697, retrieved from http://openaccess.thecvf.com/content_ICCV_2019/papers/Novotny_C3DPO_Canonical_3D_Pose_Networks_for_Non-Rigid_Structure_From_Motion_ICCV_2019_paper.pdf.

Pavlakos et al., "Ordinal Depth Supervision for 3D Human Pose Estimation," CVPR, 2018, 7307-7316, retrieved from http://openaccess.thecvf.com/content_cvpr_2018/papers/Pavlakos_Ordinal_Depth_Supervision_CVPR_2018_paper.pdf.

Pavlakos et al., "Coarse-to-Fine Volumetric Prediction for Single-Image 3D Human Pose," CVPR, 2017, pp. 7025-7034, retrieved from http://openaccess.thecvf.com/content_cvpr_2017/papers/Pavlakos_Coarse-To-Fine_Volumetric_Prediction_CVPR_2017_paper.pdf.

Pavllo et al., "3D human pose estimation in video with temporal convolutions and semi-supervised training," CVPR, 2019, pp. 7753-7762, retrieved from http://openaccess.thecvf.com/content_CVPR_2019/papers/Pavllo_3D_Human_Pose_Estimation_in_Video_With_Temporal_Convolutions_and_CVPR_2019_paper.pdf.

Pons-Moll et al., "Posebits for Monocular Human Pose Estimation," CVPR, 2014, 8 pages, retrieved from http://www.cs.toronto.edu/~fleet/research/Papers/posebits_cvpr2014.pdf.

Popa et al., "Deep Multitask Architecture for Integrated 2D and 3D Human Sensing," CVPR, 2017, pp. 6289-6298, retrieved from http://openaccess.thecvf.com/content_cvpr_2017/papers/Popa_Deep_Multitask_Architecture_CVPR_2017_paper.pdf.

Rogez et al., "MoCap-guided Data Augmentation for 3D Pose Estimation in the Wild," Proceedings of the 30th International Conference on Neural Information Processing Systems, Dec. 2016, pp. 1-9, retrieved from https://papers.nips.cc/paper/6563-mocap-guided-data-augmentation-for-3d-pose-estimation-in-the-wild.pdf.

Rogez et al., "LCR-Net: Localization-Classification-Regression for Human Pose," CVPR, 2017, pp. 3433-3441, retrieved from http://openaccess.thecvf.com/content_cvpr_2017/papers/Rogez_LCR-Net_Localization-Classification-Regression_for_CVPR_2017_paper.pdf.

Ronchi et al., "It's all Relative: Monocular 3D Human Pose Estimation from Weakly Supervised Data," Machine Vision and Applications, May 2018, pp. 1-19, retrieved from https://www.researchgate.net/publication/325753053_It's_all_Relative_Monocular_3D_Human_Pose_Estimation_from_Weakly_Supervised_Data.

Shi et al., "FBI-Pose: Towards Bridging the Gap between 2D Images and 3D Human Poses using Forward-or-Backward Information," Computer Science, 2018, pp. 1-9, retrieved from https://www.semanticscholar.org/paper/FBI-Pose%3A-Towards-Bridging-the-Gap-between-2D-and-Shi-Han/4f3f08bcc36778d45dfd5c6f6b8aff070bcfe9a4.

Sun et al., "Deep High-Resolution Representation Learning for Human Pose Estimation," CVPR, 2019, pp. 5693-5703, retrieved from http://openaccess.thecvf.com/content_CVPR_2019/papers/Sun_Deep_High-Resolution_Representation_Learning_for_Human_Pose_Estimation_CVPR_2019_paper.pdf.

Tome et al., "Lifting from the Deep: Convolutional 3D Pose Estimation from a Single Image," CVPR, 2017, pp. 2500-2509, retrieved from http://openaccess.thecvf.com/content_cvpr_2017/papers/Tome_Lifting_From_the_CVPR_2017_paper.pdf.

Tung et al., "Self-supervised Learning of Motion Capture," Conference on Neural Information Processing Systems, 2017, pp. 1-11.

Tung et al., "Adversarial Inverse Graphics Networks: Learning 2D-to-3D Lifting and Image-to-Image Translation from Unpaired Supervision," ICCV, 2017, pp. 4354-4362, retrieved from http://openaccess.thecvf.com/content_ICCV_2017/papers/Tung_Adversarial_Inverse_Graphics_ICCV_2017_paper.pdf.

Varol et al., "Learning from Synthetic Humans," CVPR, 2017, pp. 109-117, retrieved from http://openaccess.thecvf.com/content_cvpr_2017/papers/Varol_Learning_From_Synthetic_CVPR_2017_paper.pdf.

Wandt et al., "RepNet: Weakly Supervised Training of an Adversarial Reprojection Network for 3D Human Pose Estimation," CVPR, 2019, pp. 7782-7791, retrieved from http://openaccess.thecvf.com/content_CVPR_2019/papers/Wandt_RepNet_Weakly_Supervised_Training_of_an_Adversarial_Reprojection_Network_for_CVPR_2019_paper.pdf.

Chen et al., "Synthesizing Training Images for Boosting Human 3D Pose Estimation," CVPR, 2017, 10 pages, retrieved from https://arxiv.org/abs/1604.02703.

Iqbal et al., "A Dual-Source Approach for 3D Human Pose Estimation from a Single Image," Computer Vision and Image Understanding, Jul. 1, 2018, pp. 1-13, retrieved from https://scholar.google.com/citations?user=QSKXFiYAAAAJ&hl=en#d=gs_md_cita-d&u=%2Fcitations%3Fview_op%3Dview_citation%26hl%3Den%26user%3DQSKXFiYAAAAJ%26citation_for_view%3DQSKXFiYAAAAJ%3AM3ejUd6NZC8C%26tzom%3D420.

Rhodin et al., "Unsupervised Geometry-Aware Representation for 3D Human Pose Estimation," ECCV, 2018, pp. 1-18, retrieved from https://www.aminer.cn/pub/5c8da3004895d9cbc675806a/unsupervised-geometry-aware-representation-for-d-human-pose-estimation.

Wang et al., "Distill Knowledge from NRSfM for Weakly Supervised 3D Pose Learning," ICCV, 2019, 10 pages, retrieved from https://mightychaos.github.io/.

Wu et al., "Single Image 3D Interpreter Network," ECCV, 2016, pp. 1-18, retrieved from https://arxiv.org/abs/1604.08685.

Yang et al., "3D Human Pose Estimation in the Wild by Adversarial Learning," CVPR, 2018, pp. 5255-5264, retrieved from http://openaccess.thecvf.com/content_cvpr_2018/papers/Yang_3D_Human_Pose_CVPR_2018_paper.pdf.

Zhou et al., "Towards 3D Human Pose Estimation in the Wild: a Weakly-supervised Approach," ICCV, 2017, pp. 398-407, retrieved from http://openaccess.thecvf.com/content_ICCV_2017/papers/Zhou_Towards_3D_Human_ICCV_2017_paper.pdf.

\* cited by examiner

3D HUMAN BODY POSE ESTIMATION USING A MODEL TRAINED FROM UNLABELED MULTI-VIEW DATA

CLAIM OF PRIORITY

This application claims the benefit of U.S. Provisional Application No. 62/975,103 titled "Learning to Estimate 3D Human Body Pose Using Multi-View Supervision," filed Feb. 11, 2020, the entire contents of which is incorporated herein by reference.

TECHNICAL FIELD

The present disclosure relates to neural networks, and more particularly to pose estimation neural networks.

BACKGROUND

Learning to estimate a 3-dimensional (3D) body pose, and likewise the pose of any type of object, from a single 2-dimensional (2D) image is of great interest for many practical applications. Generally, this estimation involves producing a 3D pose that matches the spatial position of a person depicted in a given 2D image. Estimated 3D body poses can be used in various computer vision applications.

State-of-the-art methods use images annotated with 3D poses and train deep neural networks to directly regress 3D pose from an input image or images. However, there are multiple drawbacks of these methods. In particular, while the performance of these methods has improved significantly, their applicability to in-the-wild environments has been limited due to the lack of training data with ample diversity. The commonly used training datasets, such as Human3.6M, are collected in controlled indoor settings using sophisticated multi-camera motion capture systems.

Moreover, scaling such systems to unconstrained outdoor environments is impractical. This is because manual annotations are difficult to obtain and prone to errors. Therefore, some current methods resort to using existing training data while trying to improve the generalizability of trained models by incorporating additional weak supervision in the form of various 2D annotations for in-the-wild images. While 2D annotations can be obtained easily, they do not provide sufficient information about the 3D body pose, especially when the body joints are foreshortened or occluded.

There is a need for addressing these issues and/or other issues associated with the prior art.

SUMMARY

A method, computer readable medium, and system are disclosed for training a three-dimensional (3D) pose estimation model from unlabeled multi-view data. In use, a plurality of unlabeled images of a particular object is received as input, each unlabeled image captured from a different viewpoint. Further, a model is trained, using the plurality of unlabeled images, for use by a process that estimates a 3D pose for a given 2-dimensional (2D) image.

DETAILED DESCRIPTION

Figure 1:
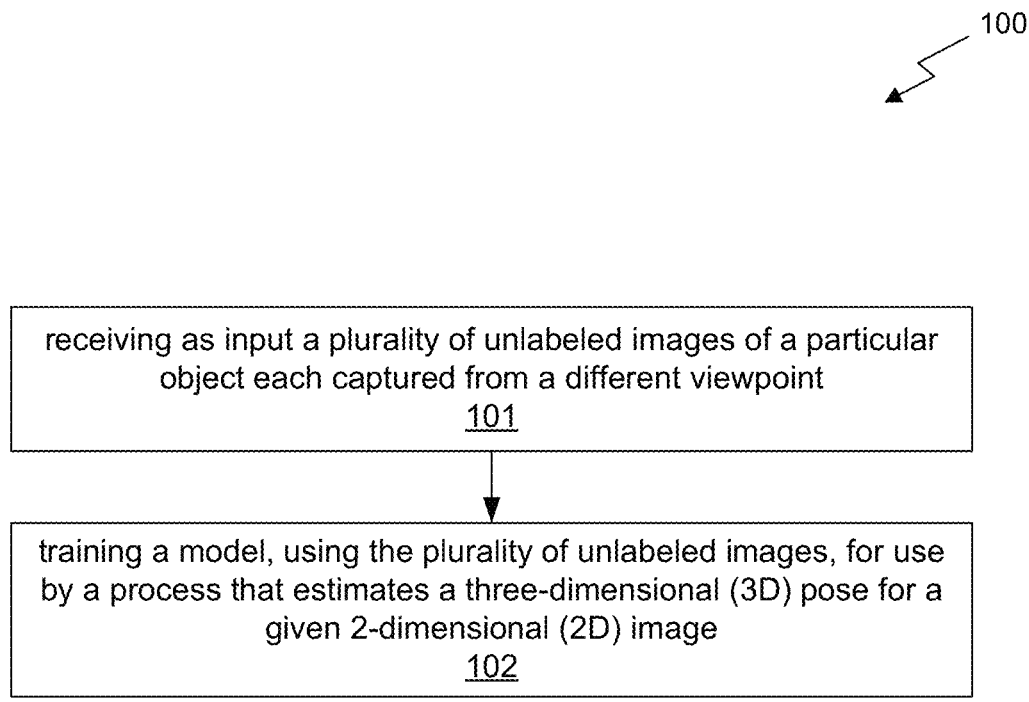
FIG. 1 illustrates a flowchart of a method for training a model from unlabeled multi-view data for use in three-dimensional (3D) pose estimation, in accordance with an embodiment.

FIG. 1 illustrates a flowchart of a method 100 for training a model from unlabeled multi-view data for use in three-dimensional (3D) pose estimation, in accordance with an embodiment. The method 100 may be performed by a processing unit, a program, custom circuitry, or a combination thereof.

As shown in operation 101, a plurality of unlabeled images of a particular object is received as input, each unlabeled image captured from a different viewpoint. Since the unlabeled images are captured from different viewpoints (e.g. different camera positions), the unlabeled images may also be referred to herein as multi-view images, each being a 2-dimensional (2D) image capturing the object while in substantially the same pose, or possibly at the same instant in time, but from a different viewpoint. It should be noted that the plurality of unlabeled images may include at least two unlabeled images.

In various embodiments described herein, the object is referred to as a human. However, it should be noted that these embodiments may equally be applied to other categories of structural objects capable of being represented by unique key points, and therefore are not limited to only human objects. For example, in other embodiments the object may be a static object (e.g. chair), moving object (e.g. car), etc.

In the context of the present description, the unlabeled images refer to images without 3D pose annotations. Thus, the 3D pose ground truth for the object may be unknown. In a further embodiment, the unlabeled images may be captured without calibrating camera position. In other words, a location of each camera with respect to the object may be unknown or at least unspecified.

Further, as shown in operation 102, a model is trained, using the plurality of unlabeled images, for use by a process (of a system) that estimates a 3D pose for a given 2D image. The given 2D image may be any unlabeled image of an object, where the object is of the same category as the object captured by the unlabeled images received in operation 101. To this end, the method 100 may optionally be repeated for different object categories, in order to train the model for use in estimating 3D pose for given 2D images of those various object categories.

In one embodiment, especially where the object is a human, the 3D pose may be defined by 3D locations of joints (e.g. bone joints) with respect to a camera (i.e. a particular camera position with respect to the object). In one embodiment, the process may include a first layer that includes the model which is trained to predict 2.5 dimension (2.5D) pose for the given 2D image. The 2.5D pose be defined by 2D pose coordinates and relative depth values. In a further embodiment, the process may include a second layer that implements 3D reconstruction of the 2.5D pose to estimate the 3D pose for the given 2D image.

Various embodiments of the training and use of the above mentioned model will now be set forth, including various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described. For example, embodiments described below may refer to a neural network, but it should be noted that other learning-based models are also contemplated.

Figure 2:
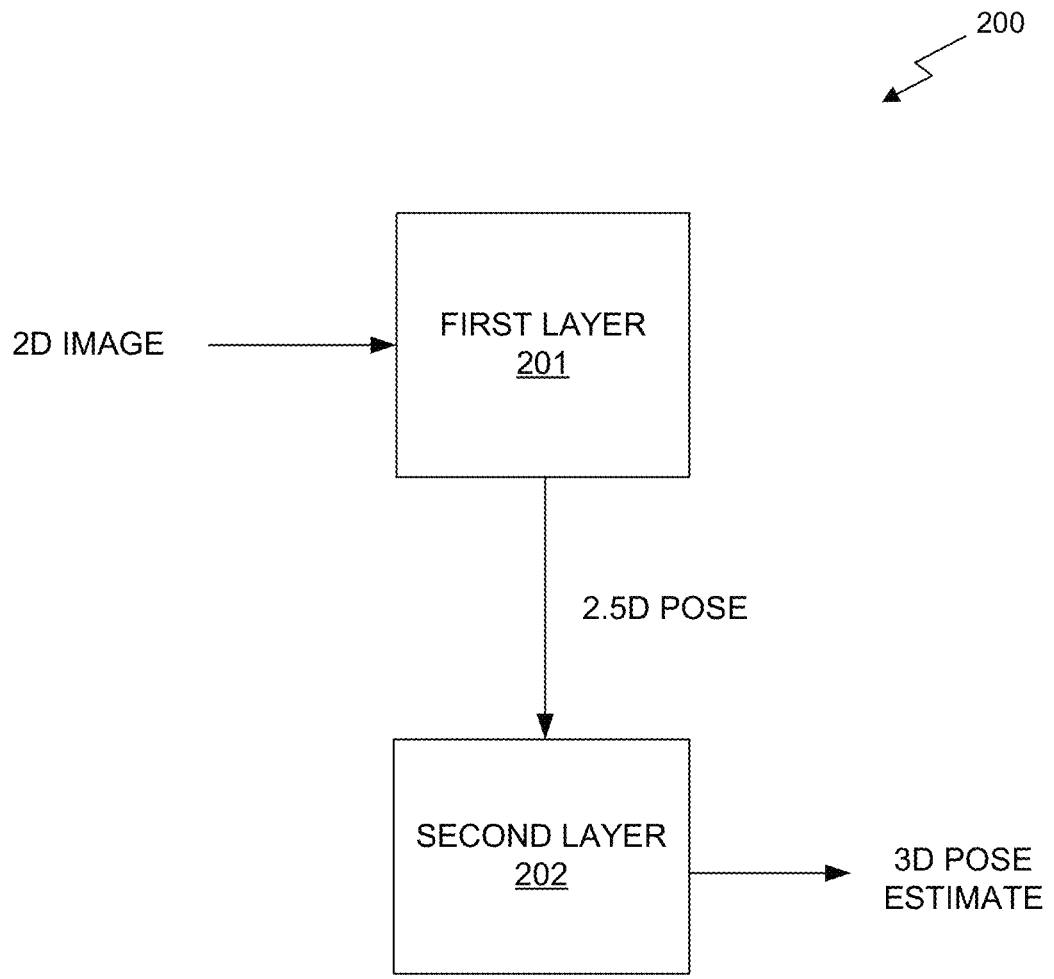
FIG. 2 illustrates layers of a system to estimate 3D pose from a given 2D image, in accordance with an embodiment.

FIG. 2 illustrates a block diagram showing layers of a system 200 that estimates 3D pose from a given 2D image, in accordance with an embodiment. The system 200 described herein may be one embodiment of the system implementing the process described above in FIG. 1.

As shown, the system 200 includes a first layer 201 having a neural network that predicts 2.5D pose for a given 2D image of an object. The 2.5D pose is defined by 2D pose coordinates and relative depth values. Thus, the first layer 201 of the system 200 may receive as input the given 2D image, and may process the given 2D image of the object to estimate the 2D pose coordinates of the object as well as the relative depth values for those 2D pose coordinates.

As also shown, the system 200 includes a second layer 202 that implements 3D reconstruction of the 2.5D pose to estimate a 3D pose for the given 2D image of the object. The second layer 202 of the system 200 may receive as input the 2.5D pose predicted by the first layer 201 of the system 200, and may further perform 3D reconstruction of the 2.5D pose to estimate a 3D pose for the given 2D image of the object.

2.5D Pose Representation

In prior art, the 2.5D pose representation $P^{2.5D} = \{P_j^{2.5D} = (x_j, y_j, Z_j^r)\}_{j \in J}$ where $x_j$ and $y_j$ are the 2D projection of body joint j on a camera plane and $Z_j^r = Z_{root} - Z_j$ represents its metric depth with respect to the root joint. This decomposition of 3D joint locations into their 2D projection and relative depth has the advantage that additional supervision from in-the-wild images with only 2D pose annotations can be used for better generalization of the trained models. However, this representation does not account for scale ambiguity present in the image which might lead to ambiguities in predictions.

The 2.5D representation used in the present embodiments, however, differs from the rest in terms of scale normalization of 3D poses. One embodiment of the 2.5D representation is disclosed in U.S. patent application Ser. No. 16/290,643, filed Mar. 1, 2019 and entitled "THREE-DIMENSIONAL (3D) POSE ESTIMATION FROM A MONOCULAR CAMERA," the details of which are incorporated herein by reference. Specifically, they scale normalize the 3D pose P such that a specific pair of body joints have a fixed distance C:

$$\hat{P} = \frac{C}{s} \cdot P, \quad (1)$$

where $s = \|P_k - P_l\|_2$ is estimated independently for each pose. The resulting scale normalized 2.5D pose representation $\hat{P}_j^{2.5D} = (x_j, y_j, \hat{Z}_j^r)$ is agnostic to the scale of the person, which not only makes it easier to be estimated from cropped RGB images, but also allows to reconstruct the absolute 3D pose of the person up to a scaling factor in a fully differentiable manner as described below.

Differentiable 3D Reconstruction

Given the 2.5D pose $\hat{P}^{2.5D}$, the aim is to find the depth $\hat{Z}^{root}$ of the root joint to reconstruct the scale normalized 3D locations $\hat{P}_j$ of body joints using perspective projection:

$$\hat{P}_j = \hat{Z}_j K^{-1} \begin{bmatrix} x_j \\ y_j \\ 1 \end{bmatrix} = (\hat{Z}_{root} + \hat{Z}_j^r) K^{-1} \begin{bmatrix} x_j \\ y_j \\ 1 \end{bmatrix}. \quad (2)$$

The value of $Z_{root}$ can be calculated via the scale normalization constraint:

$$(\hat{X}_k - \hat{X}_l)^2 + (\hat{Y}_k - \hat{Y}_l)^2 + (\hat{Z}_k - \hat{Z}_l)^2 = C^2, \quad (3)$$

which leads to a quadratic equation with the following coefficients:

$$a = (\bar{x}_k - \bar{x}_l)^2 + (\bar{y}_k - \bar{y}_l)^2$$

$$b = 2(\hat{Z}_k^r(\bar{x}_k^2 + \bar{y}_k^2 - \bar{x}_k \bar{x}_l - \bar{y}_k \bar{y}_l) + \hat{Z}_l^r(\bar{x}_l^2 + \bar{y}_l^2 - \bar{x}_k \bar{x}_l - \bar{y}_k \bar{y}_l)) \quad (4)$$

$$c = (\bar{x}_k \hat{Z}_k^r - \bar{x}_l \hat{Z}_l^r)^2 + (\bar{y}_k \hat{Z}_k^r - \bar{y}_l \hat{Z}_l^r)^2 + (\hat{Z}_k^r - \hat{Z}_l^r)^2 - C^2, \quad (5)$$

i.e., $\hat{Z}_{root} = 0.5(-b + \sqrt{b^2 - 4ac})/a$. Here $[\overline{xy}1] = K^{-1}[x \ y \ 1]^T$, and the pair (k, l) corresponds to the indices of the body joints used for scale normalization in equation (1) above. Since all operations for 3D reconstruction are differentiable, loss functions can be devised that directly operate on the reconstructed 3D poses.

In the following descriptions, the scale normalized 2.5D representation is used. C=1 is used, as well as the distance between the neck and pelvis joints to calculate the scaling factor s. Of course, it should be noted that C may be any other value, as desired. In contrast to the embodiments described herein, prior art methods resort to either using the ground-truth values for $Z_{root}$ or adopt optimization based methods.

2D Pose Regression

Since the 3D pose can be reconstructed analytically from 2.5D pose, the network is trained to predict 2.5D pose and implement 3D reconstruction as an additional layer, as shown in neural network 200 of FIG. 2. To this end, a 2.5D heatmap regression approach is adopted. Specifically, given an RGB image as input, the neural network 200 produces 2J channels as output with J channels for 2D heatmaps ($H^{2D}$) while the remaining J channels are regarded as latent depth maps $H^{Z^r}$. The 2D heatmaps are converted to a vector of 2D pose coordinates by first normalizing them using spatial softmax:

$$\overline{H}_j^{2D}(x, y) = \frac{\exp(\lambda H_j^{2D}(x, y))}{\sum_{x', y' \in X} \exp(\lambda H_j^{2D}(x', y'))}, \quad (6)$$

and then using the softargmax operation:

$$x_j, y_j = \sum_{x, y \in X} \overline{H}_j^{2D}(x, y) \cdot (x, y), \quad (7)$$

where X is a 2D grid sampled according to the effective stride size of the network 200, and $\lambda$ is a constant that controls the temperature of the normalized heatmaps.

The relative scale normalized depth value $\hat{Z}_j^r$ for each body joint can then be obtained as the summation of the element-wise multiplication of $\overline{H}_j^{2D}$ and latent depth maps $H^{Z^r}$:

$$\hat{Z}_j^r = \sum_{x,y \in X} \overline{H}_j^{2D}(x, y) \odot H_j^{\hat{z}^r}(x, y). \tag{8}$$

Given the 2D pose coordinates $\{(x_j, y_j)\}_{j \in J}$, relative depths $\hat{Z}^r$ and intrinsic camera parameters K, the 3D pose can be reconstructed using the second layer of the neural network 202, as explained above.

In the fully-supervised (FS) setting, the network can be trained using the following loss function:

$$\mathcal{L}_{FS} = \mathcal{L}_H(H^{2D}, H_{gt}^{2D}) + \psi \mathcal{L}_Z(\hat{Z}^r, \hat{Z}_{gt}^r), \tag{9}$$

where $H_{gt}^{2D}$ and $\hat{Z}_{gt}^r$ are the ground-truth 2D heatmaps and ground-truth scale-normalized relative depth values, respectively. Mean squared error is used as the loss functions $\mathcal{L}_Z(\cdot)$ and $\mathcal{L}_H(\cdot)$. In other possible embodiments, other loss functions may be used, but in any case these loss functions minimize the difference between the predictions of the neural network and the ground-truth 2D annotations.

To this end, the network 200 may not necessarily learn 2D heatmaps in a latent way. Instead, the 2D heatmaps predictions can be supervised via ground-truth heatmaps with Gaussian distributions at the true joint locations. The confidence values are relied upon to devise a weakly-supervised loss that is robust to uncertainties in 2D pose estimates, as described below. Other embodiments may be used, however, whether the heatmaps are learned in a latent way.

Figure 3A:
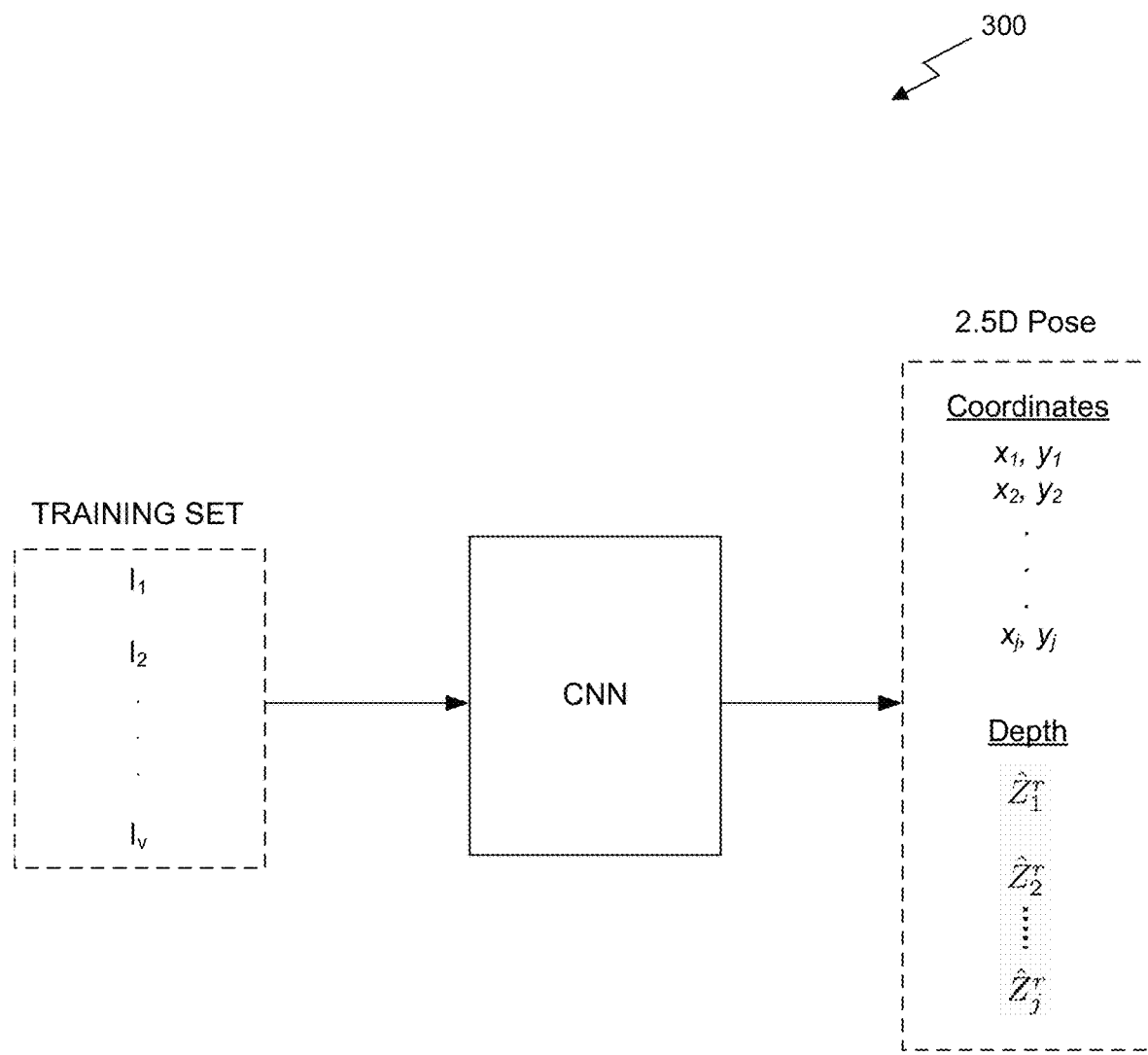
FIG. 3A illustrates a block diagram of the training process for a model of the first layer of the system of FIG. 2, in accordance with an embodiment.
Figure 3B:
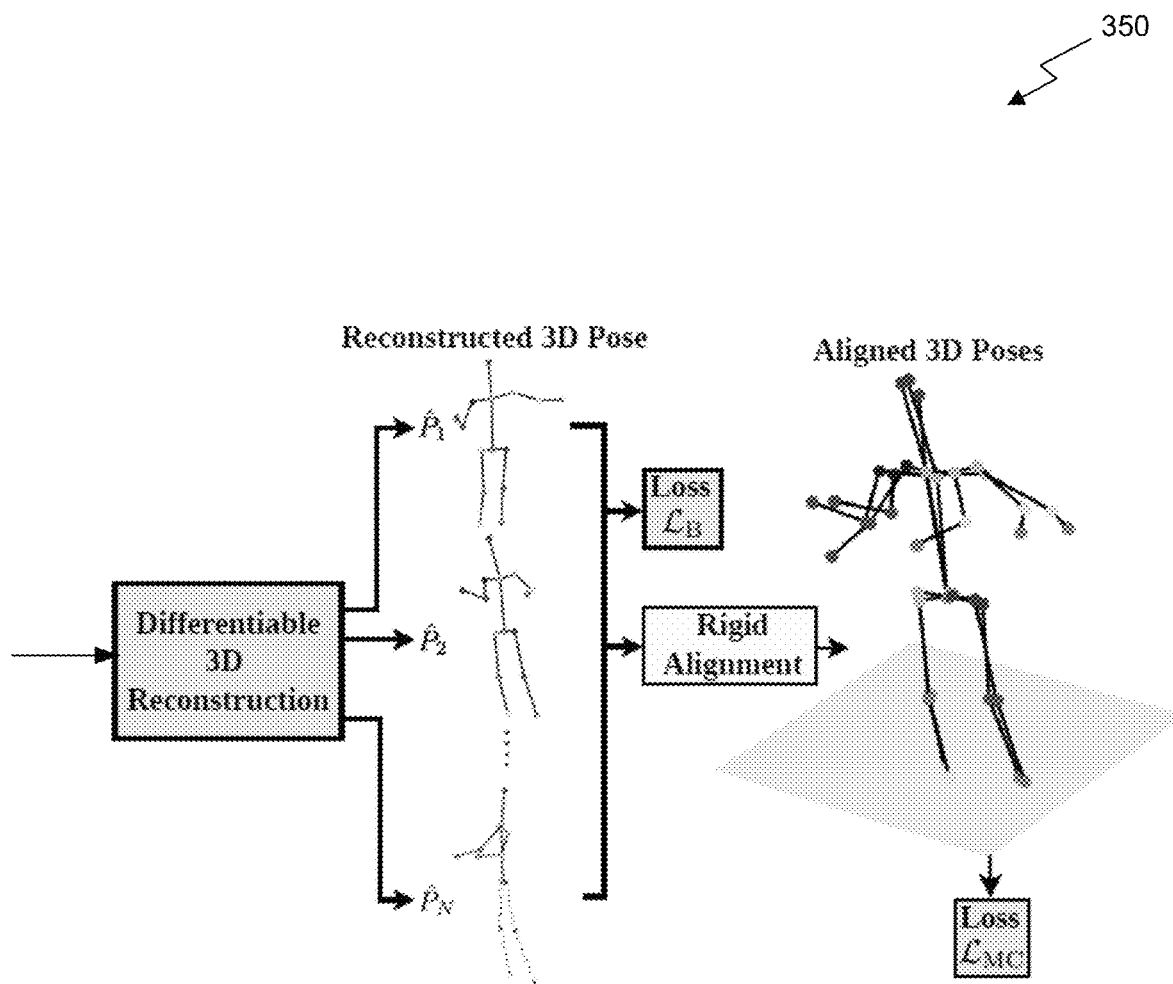
FIG. 3B illustrates a block diagram of the process of a second layer of the system of FIG. 2, in accordance with an embodiment.

The goal of FIGS. 3A-B is to train the convolutional neural network $\mathcal{F}(I, \theta)$ parameterized by weights $\theta$ that, given an RGB image I as input, estimates the 3D body pose $P = \{P_j\}_{j \in J}$ consisting of 3D locations $P_j = (X_j, Y_j, Z_j) \in \mathbb{R}^3$ of J body joints with respect to the camera.

The training process does not assume any training data with paired 2D-3D annotations, but learns the parameters $\theta$ of the network in a weakly-supervised way using only multi-view images. The network is trained to determine the 2.5D pose representation for the given 2D image of an object, as described above. This 2.5D pose representation has several key features that allow multi-view information to be exploited, as mentioned above, and loss functions are devised for weakly-supervised training.

FIG. 3A illustrates a block diagram of the training process 300 for the model of the first layer of the system 200 of FIG. 2, in accordance with an embodiment. FIG. 3B illustrates a block diagram of the process 350 for a second layer of the system 200 of FIG. 2, in accordance with an embodiment. While the processes 300, 350 are described herein with reference to a human object, it should be noted that the processes 300, 350 may similarly be employed for any other category of object.

As shown in FIG. 3A, a training data set is input to a convolutional neural network (CNN). The CNN learns, from the training data set, to infer a 2.5D pose from a given input image. As shown in FIG. 3B, the 2.5D pose output by the CNN is processed using predefined mathematical formulas in order to get the final output, which is the 3D reconstruction (i.e. scale normalized 3D pose). An exemplary implementation follows.

Described herein is an embodiment for training the regression network in a weakly-supervised way without any 3D annotations. For training, a set $M = \{\{I_v^n\} v \in V_n\} n \in N$ of N samples is assumed, with the nth sample consisting of $V_n$ views of a person in same body pose. The multi-view images can be taken at the same time using multiple cameras, or using a single camera assuming a static body pose over time. No knowledge of extrinsic camera parameters. Additionally, an independent set of images annotated only with 2D poses can be used in one embodiment (not shown), which is available abundantly or can be annotated by people even for in-the-wild data. For training, the following weakly supervised (WS) loss function is optimized:

$$\mathcal{L}_{WS} = \mathcal{L}_H(H^{2D}, H_{gt}^{2D}) + \alpha \mathcal{L}_{MC}(M) + \beta \mathcal{L}_B(\hat{L}, \overline{\mu}^L), \tag{10}$$

where $\mathcal{L}_H$ is the 2D heatmap loss, $\mathcal{L}_{MC}$ is the multi-view consistency loss, and $\mathcal{L}_B$ is the limb length loss.

Recall that, given an RGB image, the goal is to estimate the scale normalized 2.5D pose $\hat{P}^{2.5D} = \{P_j^{2.5D} = (x_j, y_j, \hat{Z}_j^r)\} j \in J$ from which the scale normalized 3D pose $\hat{P}$ is reconstructed, as explained above. While $\mathcal{L}_H$ provides supervision for 2D pose estimation, the loss $\mathcal{L}_{MC}$ is responsible for learning to estimate the relative depths component $(\hat{Z}_j^r)$. The limb length loss $\mathcal{L}_B$ further ensures that the reconstructed 3D pose $\hat{P}$ has plausible limb lengths. These loss functions are explained in more detail below.

As shown in FIG. 3A, the first layer 201 is trained to generate 2D heatmaps $H^{2D}$ for each unlabeled image of the plurality of unlabeled images $I_{I-v}$, and to generate latent depth-maps $H^{Z^r}$ for each unlabeled image of the plurality of unlabeled images.

In one embodiment, at least one labeled image may also be received, where each labeled is of a corresponding object different than the object captured by unlabeled images and is annotated with a 2D pose of the corresponding object. In this embodiment, the labeled image is used for determining heatmap loss $\mathcal{L}_H$ during the training, described in detail below.

The first layer 201 further normalizes the 2D heatmaps to generate normalized 2D heatmaps. Additionally, the first layer 201 converts the normalized 2D heatmaps to 2D pose coordinates. In this embodiment, the first layer 201 obtains relative depth values from the latent depth-maps and the normalized 2D heatmaps, where the relative depth values and the 2D pose coordinates define the 2.5D pose.

As shown in FIG. 3B, the second layer 202 determines a depth of a root joint, and use the depth of the root joint to reconstruct scale normalized 3D locations of joints using perspective projection. In this embodiment, predefined average lengths for one or more aspects of the object are used for determining length loss (e.g. bone loss $\mathcal{L}_B$) associated with the scale normalized 3D locations of the joints during training, described in one embodiment below. The second layer 202 performs rigid alignment for the scale normalized 3D locations of the joints to generate the 3D pose. This rigid alignment aligns the 3D poses from two different views by removing the rotation, translation and scaling between them. In this embodiment, multi-view consistency loss $\mathcal{L}_{MC}$ is determined for the 3D pose during training, where the multi-view consistency loss enforces that 3D poses generated from different views should be the same up to a rigid transform.

Loss

Heatmap Loss ($\mathcal{L}_H$) measures the difference between the predicted 2D heatmaps $H^{2D}$ and ground-truth heatmaps $H_{gt}^{2D}$ with Gaussian distribution at the true joint location. It operates only on images annotated with 2D poses and is assumed to be zero for all other images.

Multi-View Consistency Loss ($\mathcal{L}_{MC}$) enforces that the 3D pose estimates obtained from different views should be identical up to a rigid transform. Formally, given a multiview training sample with V views $\{I_v\}v \in V$, the multi-view consistency loss is defined as the weighted sum of the difference between the 3D joint locations across different views after a rigid alignment:

$$\mathcal{L}_{MC} = \sum_{\substack{v,v' \in V \\ v \neq v'}} \sum_{j \in J} \phi_{j,v} \phi_{j,v'} \cdot d(\hat{P}_{j,v}, R_v^{v'} \hat{P}_{j,v'}), \tag{11}$$

where $$\phi_{j,v} = H_{j,v}^{2D}(x_{j,v}, y_{j,v}) \text{ and } \phi_{j,v'} = H_{j,v'}^{2D}(x_{j,v'}, y_{j,v'})$$

are the confidence scores of the jth joint in viewpoint $I_v$ and $I_{v'}$, respectively. The $\hat{P}_{j,v}$ and $\hat{P}_{j,v'}$ are the scale normalized 3D coordinates of the jth joint estimated from viewpoint $I_v$ and $I_{v'}$, respectively. $R_v^{v'} \in \mathbb{R}^{3 \times 4}$ is a rigid transformation matrix that best aligns the two 3D poses, and d is the distance metric used to measure the difference between the aligned poses. $L_1$-norm is used as the distance metric d, in one embodiment. In order to understand the contribution of $\mathcal{L}_{MC}$ more clearly, the distance term in (11) can be rewritten in terms of the 2.5D pose representation using (2), i.e.:

$$d(\hat{P}_{j,v}, R_v^{v'} \hat{P}_{j,v'}) = \tag{12}$$

$$d\left( (\hat{Z}_{root,v} + \hat{Z}_{j,v}^r) K_v^{-1} \begin{bmatrix} x_{j,v} \\ y_{j,v} \\ 1 \end{bmatrix}, R_v^{v'} (\hat{Z}_{root,v'} + \hat{Z}_{j,v'}^r) K_{v'}^{-1} \begin{bmatrix} x_{j,v'} \\ y_{j,v'} \\ 1 \end{bmatrix} \right).$$

Let us assume that the 2D coordinates $(x_{j,v}, y_{j,v})$ and $(x_{j,v'}, y_{j,v'})$ are predicted accurately due to the loss $\mathcal{L}_H$ and the camera intrinsics $K_v$ and $K_{v'}$ are known. For simplicity, let us also assume the ground-truth transformation $R_v^{v'}$ between the two views is known. Then, the only way for the network to minimize the difference d(...) is to predict the correct values for relative depths $\hat{Z}_{j,v}^r$ and $\hat{Z}_{j,v'}^r$. Hence, the joint optimization of the losses $\mathcal{L}_H$ and $\mathcal{L}_{MC}$ allows correct 3D poses to be learned using only weak supervision in the form of multi-view images and 2D pose annotations. Without the loss $\mathcal{L}_H$ the model can lead to degenerated solutions, although other embodiments are considered where loss $\mathcal{L}_H$ is not utilized during training.

While in many practical scenarios, the transformation matrix $R_v^{v'}$ can be known a priori via extrinsic calibration, the present embodiments assume it is not available and estimate it using predicted 3D poses and Procrustes analysis as follows:

$$R_v^{v'} = \operatorname*{argmin}_R \sum_{j \in J} \phi_{j,v} \phi_{j,v'} \|\hat{P}_{j,v} - R\hat{P}_{j,v'}\|_2^2. \tag{13}$$

During training, an embodiment may not back-propagate through the optimization of transformation matrix (13), since it leads to numerical instabilities arising due to singular value decomposition. The gradients from $\mathcal{L}_{MC}$ not only influence the depth estimates, but also affect heatmap predictions due to the calculation of $Z_{root}$ in (4). Therefore, $\mathcal{L}_{MC}$ can fix the errors in 2D pose estimates.

Limb Length Loss ($\mathcal{L}_B$) measures the deviation of the limb lengths of predicted 3D pose from the mean bone lengths:

$$\mathcal{L}_B = \sum_{j,j' \in \mathcal{E}} \phi_j (\|\hat{P}_j - \hat{P}_{j'}\| - \hat{\mu}_{j,j'}^L)^2, \tag{14}$$

where $\mathcal{E}$ corresponds to the used kinematic structure of the human body and $\hat{\mu}_{j,j'}^L$ is the scale normalized mean limb length for joint pair (j,j'). Since the limb lengths of all people will be roughly the same after scale normalization (1), this loss ensures that the predicted poses have plausible limb lengths. During training, having a limb length loss leads to faster convergence.

Additional Regularization

If a large number of samples in multi-view data have a constant background, the network 200 may learn to recognize these images and predicts the same 2D pose and relative depths for these images. In order to prevent this, an additional regularization loss can be incorporated for such samples. Specifically, a pre-trained 2D pose estimation model can be run to generate pseudo ground-truths by selecting joint estimates with confidence score greater than a threshold $\tau=0.5$. These pseudo ground-truths are then used to enforce the 2D heatmap loss $\mathcal{L}_H$, which prevents the model from predicting degenerated solutions. The pseudo ground-truths can be generated once at the beginning of the training and kept fixed throughout. Specifically, the regularization loss for images from Human3.6M and MPII-INF-3DHP can be used which are both recorded in controlled indoor settings.

Exemplary Implementation

We adopt HRNet-w32 as the back-bone of our network architecture. We pre-train the model for 2D pose estimation before introducing weakly-supervised losses. This ensures that the 2D pose estimates are sufficiently good to enforce multi-view consistency $\mathcal{L}_{MC}$. We use a maximum of four views $V_n=4$ to calculate $\mathcal{L}_{MC}$. If a sample contains more than four views, we randomly sample four views from it in each epoch. We train the model with a batch size of 256, where each batch consists of 128 images with 2D pose annotations and 32 unlabeled multi-view samples (32× 4=128 images). We use an input image resolution of 256× 256. The training data is augmented by random scaling (+−20%) and rotation (+−30% degrees). We found that the training converges after 60 k iterations. The learning rate is set to 5e-4, which drops to 5e-5 at 50 k iterations following the Adam optimization algorithm. We use $\lambda=50$ in (6). Since the training objectives (9) and (10) consist of multiple loss terms, we balance their contributions by empirically choosing $\psi=5$, $\alpha=10$, and $\beta=100$. Since our pose estimation model estimates absolute 3D poses up to a scaling factor, during inference, we approximate the scale using mean bone-lengths from the training data:

$$\hat{s} = \operatorname*{argmin}_s \sum_{j,j' \in \mathcal{E}} (s \cdot \|\hat{P}_j - \hat{P}_{j'}\| - \mu_{j,j'}^L)^2, \tag{15}$$

where $\mu_{j,j'}^L$ is the mean length of the limb formed by joint pair (j, j').

The embodiment described above present a weakly supervised approach for 3D human pose estimation in the wild. The proposed approach does not require any 3D annotations and can learn to estimate 3D poses from unlabeled multi-view data. This is made possible by a novel end-to-end learning framework and a novel objective function which is optimized to predict consistent 3D poses across different camera views. Since collecting unlabeled multi-view data is very easy and a similar data is available abundantly on the web, the approach benefits when additional unlabeled data is provided. This makes the approach very practical since additional data can be incorporated very easily to improve generalizability of the trained models to previously unseen environments.

Machine Learning

Deep neural networks (DNNs), also referred to herein as neural networks and including deep learning models which have been developed on processors, have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions. Inferencing is less compute-intensive than training, being a latency-sensitive process where a trained neural network is applied to new inputs it has not seen before to classify images, translate speech, and generally infer new information.

Inference and Training Logic

As noted above, a deep learning or neural learning system needs to be trained to generate inferences from input data. Details regarding inference and/or training logic 415 for a deep learning or neural learning system are provided below in conjunction with FIGS. 4A and/or 4B.

In at least one embodiment, inference and/or training logic 415 may include, without limitation, a data storage 401 to store forward and/or output weight and/or input/output data corresponding to neurons or layers of a neural network trained and/or used for inferencing in aspects of one or more embodiments. In at least one embodiment data storage 401 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of data storage 401 may be included with other on-chip or off-chip data storage, including a processor's L1, L2, or L3 cache or system memory.

In at least one embodiment, any portion of data storage 401 may be internal or external to one or more processors or other hardware logic devices or circuits. In at least one embodiment, data storage 401 may be cache memory, dynamic randomly addressable memory ("DRAM"), static randomly addressable memory ("SRAM"), non-volatile memory (e.g., Flash memory), or other storage. In at least one embodiment, choice of whether data storage 401 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 415 may include, without limitation, a data storage 405 to store backward and/or output weight and/or input/output data corresponding to neurons or layers of a neural network trained and/or used for inferencing in aspects of one or more embodiments. In at least one embodiment, data storage 405 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, any portion of data storage 405 may be included with other on-chip or off-chip data storage, including a processor's L1, L2, or L3 cache or system memory. In at least one embodiment, any portion of data storage 405 may be internal or external to on one or more processors or other hardware logic devices or circuits. In at least one embodiment, data storage 405 may be cache memory, DRAM, SRAM, non-volatile memory (e.g., Flash memory), or other storage. In at least one embodiment, choice of whether data storage 405 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, data storage 401 and data storage 405 may be separate storage structures. In at least one embodiment, data storage 401 and data storage 405 may be same storage structure. In at least one embodiment, data storage 401 and data storage 405 may be partially same storage structure and partially separate storage structures. In at least one embodiment, any portion of data storage 401 and data storage 405 may be included with other on-chip or off-chip data storage, including a processor's L1, L2, or L3 cache or system memory.

In at least one embodiment, inference and/or training logic 415 may include, without limitation, one or more arithmetic logic unit(s) ("ALU(s)") 410 to perform logical and/or mathematical operations based, at least in part on, or indicated by, training and/or inference code, result of which may result in activations (e.g., output values from layers or neurons within a neural network) stored in an activation storage 420 that are functions of input/output and/or weight parameter data stored in data storage 401 and/or data storage 405. In at least one embodiment, activations stored in activation storage 420 are generated according to linear algebraic and or matrix-based mathematics performed by ALU(s) 410 in response to performing instructions or other code, wherein weight values stored in data storage 405 and/or data 401 are used as operands along with other values, such as bias values, gradient information, momentum values, or other parameters or hyperparameters, any or all of which may be stored in data storage 405 or data storage 401 or another storage on or off-chip. In at least one embodiment, ALU(s) 410 are included within one or more processors or other hardware logic devices or circuits, whereas in another embodiment, ALU(s) 410 may be external to a processor or other hardware logic device or circuit that uses them (e.g., a co-processor). In at least one embodiment, ALUs 410 may be included within a processor's execution units or otherwise within a bank of ALUs accessible by a processor's execution units either within same processor or distributed between different processors of different types (e.g., central processing units, graphics processing units, fixed function units, etc.). In at least one embodiment, data storage 401, data storage 405, and activation storage 420 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 620 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 420 may be cache memory, DRAM, SRAM, non-volatile memory (e.g., Flash memory), or other storage. In at least one embodiment, activation storage 420 may be completely or partially within or external to one or more processors or other logical circuits. In at least one embodiment, choice of whether activation storage 420 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 415 illustrated in FIG. 4A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 615 illustrated in FIG. 4A may be used in conjunction with central processing unit ("CPU") hardware, graphics processing unit ("GPU") hardware or other hardware, such as field programmable gate arrays ("FPGAs").

Figure 4A:
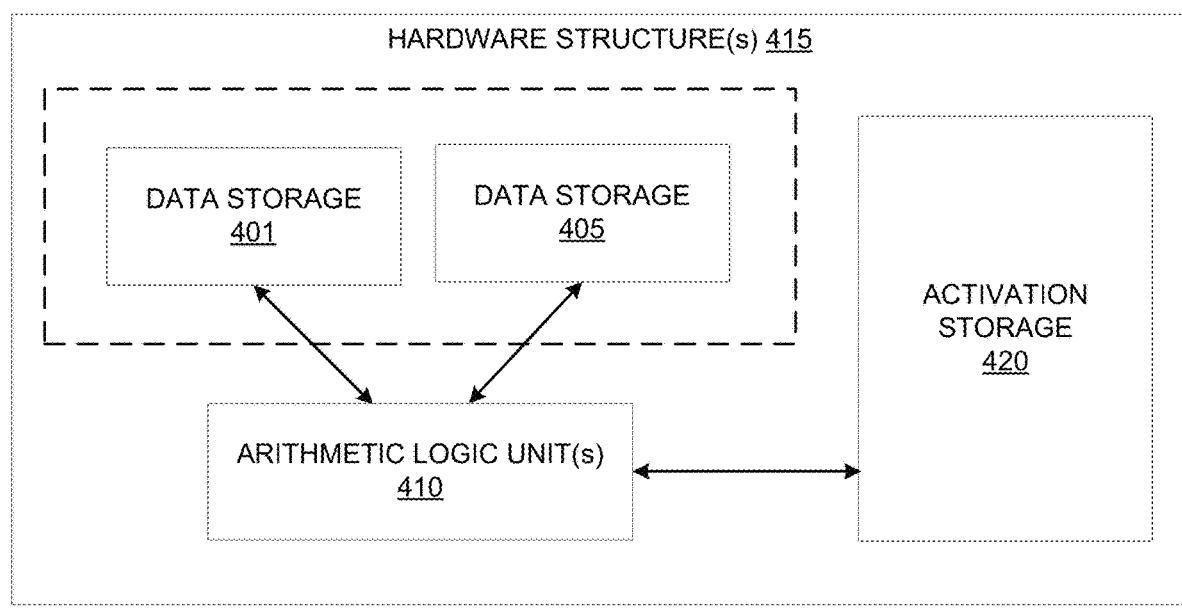
FIG. 4A illustrates inference and/or training logic, according to at least one embodiment.
Figure 4B:
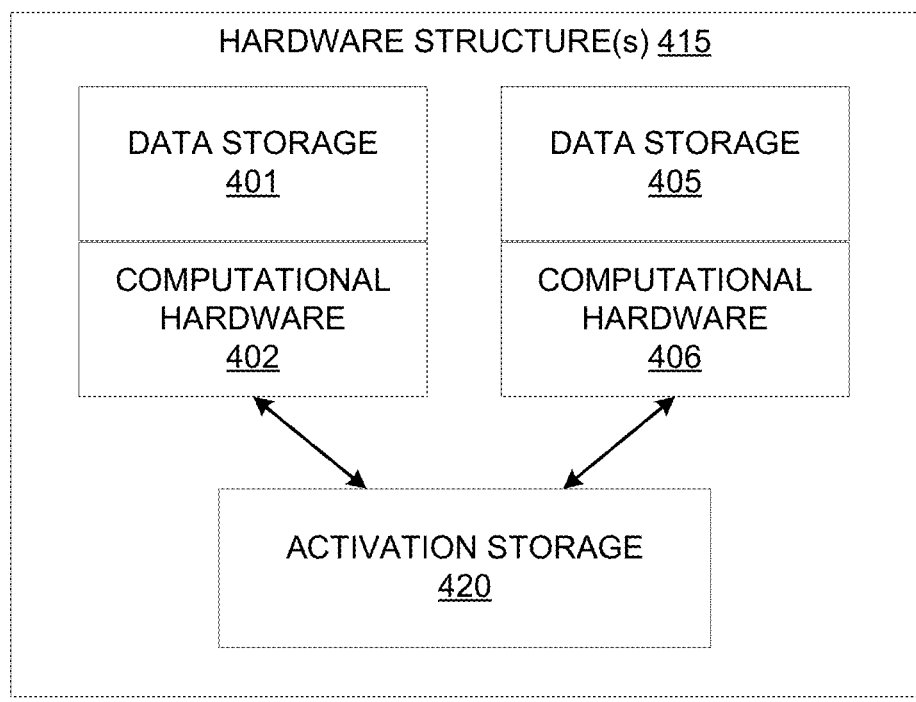
FIG. 4B illustrates inference and/or training logic, according to at least one embodiment.

FIG. 4B illustrates inference and/or training logic 415, according to at least one embodiment. In at least one embodiment, inference and/or training logic 415 may include, without limitation, hardware logic in which computational resources are dedicated or otherwise exclusively used in conjunction with weight values or other information corresponding to one or more layers of neurons within a neural network. In at least one embodiment, inference and/or training logic 415 illustrated in FIG. 4B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 415 illustrated in FIG. 4B may be used in conjunction with central processing unit (CPU) hardware, graphics processing unit (GPU) hardware or other hardware, such as field programmable gate arrays (FPGAs). In at least one embodiment, inference and/or training logic 415 includes, without limitation, data storage 401 and data storage 405, which may be used to store weight values and/or other information, including bias values, gradient information, momentum values, and/or other parameter or hyperparameter information. In at least one embodiment illustrated in FIG. 4B, each of data storage 401 and data storage 405 is associated with a dedicated computational resource, such as computational hardware 402 and computational hardware 406, respectively. In at least one embodiment, each of computational hardware 406 comprises one or more ALUs that perform mathematical functions, such as linear algebraic functions, only on information stored in data storage 401 and data storage 405, respectively, result of which is stored in activation storage 420.

In at least one embodiment, each of data storage 401 and 405 and corresponding computational hardware 402 and 406, respectively, correspond to different layers of a neural network, such that resulting activation from one "storage/computational pair 401/402" of data storage 401 and computational hardware 402 is provided as an input to next "storage/computational pair 405/406" of data storage 405 and computational hardware 406, in order to mirror conceptual organization of a neural network. In at least one embodiment, each of storage/computational pairs 401/402 and 405/406 may correspond to more than one neural network layer. In at least one embodiment, additional storage/computation pairs (not shown) subsequent to or in parallel with storage computation pairs 401/402 and 405/406 may be included in inference and/or training logic 415.

Neural Network Training and Deployment

Figure 5:
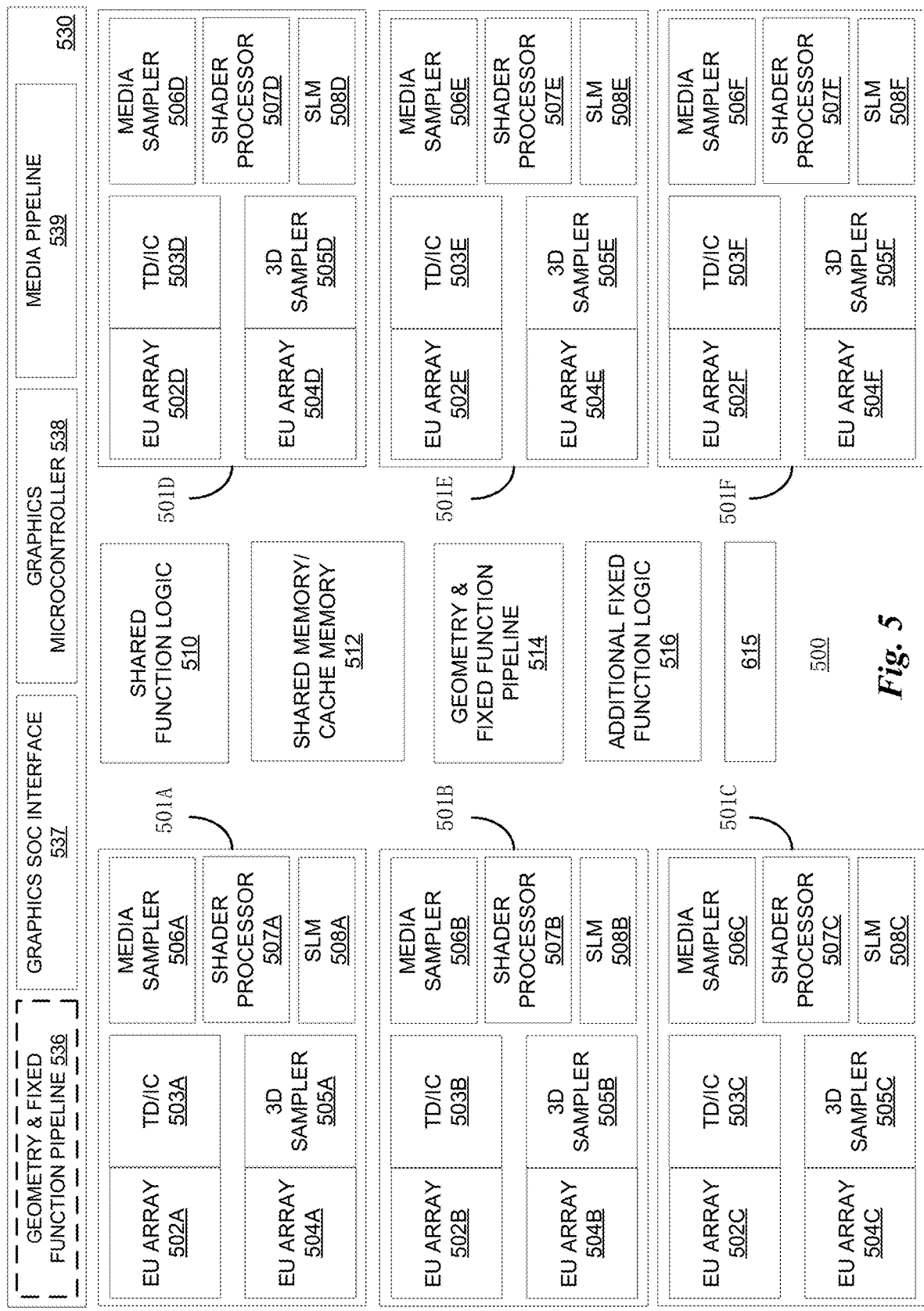
FIG. 5 illustrates training and deployment of a neural network, according to at least one embodiment.

FIG. 5 illustrates another embodiment for training and deployment of a deep neural network. In at least one embodiment, untrained neural network 506 is trained using a training dataset 502. In at least one embodiment, training framework 504 is a PyTorch framework, whereas in other embodiments, training framework 504 is a Tensorflow, Boost, Caffe, Microsoft Cognitive Toolkit/CNTK, MXNet, Chainer, Keras, Deeplearning4j, or other training framework. In at least one embodiment training framework 504 trains an untrained neural network 506 and enables it to be trained using processing resources described herein to generate a trained neural network 508. In at least one embodiment, weights may be chosen randomly or by pre-training using a deep belief network. In at least one embodiment, training may be performed in either a supervised, partially supervised, or unsupervised manner.

In at least one embodiment, untrained neural network 506 is trained using supervised learning, wherein training dataset 502 includes an input paired with a desired output for an input, or where training dataset 502 includes input having known output and the output of the neural network is manually graded. In at least one embodiment, untrained neural network 506 is trained in a supervised manner processes inputs from training dataset 502 and compares resulting outputs against a set of expected or desired outputs. In at least one embodiment, errors are then propagated back through untrained neural network 506. In at least one embodiment, training framework 504 adjusts weights that control untrained neural network 506. In at least one embodiment, training framework 504 includes tools to monitor how well untrained neural network 506 is converging towards a model, such as trained neural network 508, suitable to generating correct answers, such as in result 514, based on known input data, such as new data 512. In at least one embodiment, training framework 704 trains untrained neural network 506 repeatedly while adjust weights to refine an output of untrained neural network 506 using a loss function and adjustment algorithm, such as stochastic gradient descent. In at least one embodiment, training framework 504 trains untrained neural network 506 until untrained neural network 506 achieves a desired accuracy. In at least one embodiment, trained neural network 508 can then be deployed to implement any number of machine learning operations.

In at least one embodiment, untrained neural network 506 is trained using unsupervised learning, wherein untrained neural network 506 attempts to train itself using unlabeled data. In at least one embodiment, unsupervised learning training dataset 502 will include input data without any associated output data or "ground truth" data. In at least one embodiment, untrained neural network 506 can learn groupings within training dataset 502 and can determine how individual inputs are related to untrained dataset 502. In at least one embodiment, unsupervised training can be used to generate a self-organizing map, which is a type of trained neural network 508 capable of performing operations useful in reducing dimensionality of new data 512. In at least one embodiment, unsupervised training can also be used to perform anomaly detection, which allows identification of data points in a new dataset 512 that deviate from normal patterns of new dataset 512.

In at least one embodiment, semi-supervised learning may be used, which is a technique in which in training dataset 502 includes a mix of labeled and unlabeled data. In at least one embodiment, training framework 504 may be used to perform incremental learning, such as through transferred learning techniques. In at least one embodiment, incremental learning enables trained neural network 508 to adapt to new data 512 without forgetting knowledge instilled within network during initial training.

Data Center

Figure 6:
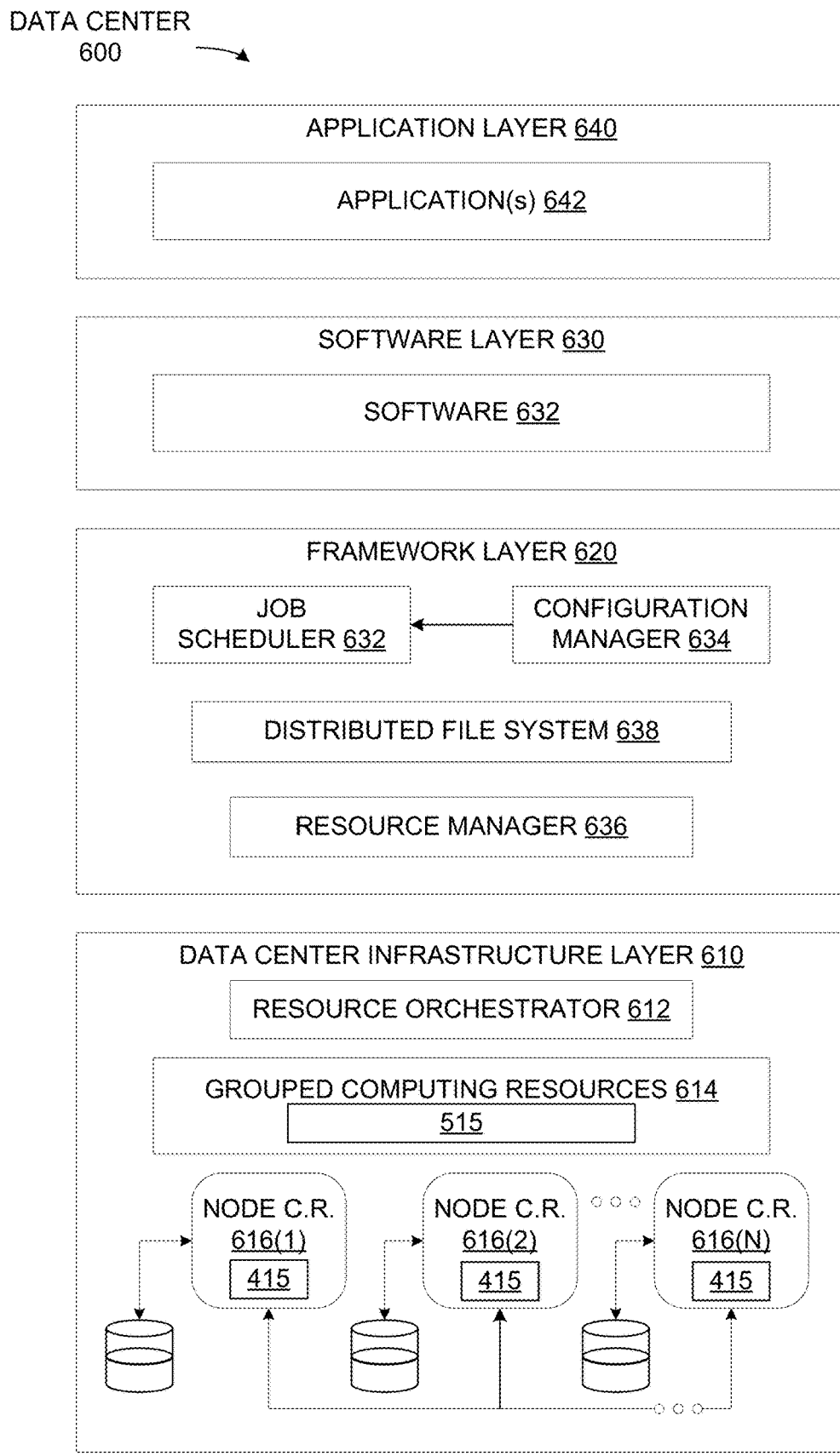
FIG. 6 illustrates an example data center system, according to at least one embodiment.

FIG. 6 illustrates an example data center 600, in which at least one embodiment may be used. In at least one embodiment, data center 600 includes a data center infrastructure layer 610, a framework layer 620, a software layer 630 and an application layer 640.

In at least one embodiment, as shown in FIG. 6, data center infrastructure layer 610 may include a resource orchestrator 612, grouped computing resources 614, and node computing resources ("node C.R.s") 616(1)-616(N), where "N" represents any whole, positive integer. In at least one embodiment, node C.R.s 616(1)-616(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 616(1)-616(N) may be a server having one or more of above-mentioned computing resources.

In at least one embodiment, grouped computing resources 614 may include separate groupings of node C.R.s housed within one or more racks (not shown), or many racks housed in data centers at various geographical locations (also not shown). Separate groupings of node C.R.s within grouped computing resources 614 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 622 may configure or otherwise control one or more node C.R.s 616(1)-616(N) and/or grouped computing resources 614. In at least one embodiment, resource orchestrator 622 may include a software design infrastructure ("SDI") management entity for data center 600. In at least one embodiment, resource orchestrator may include hardware, software or some combination thereof.

In at least one embodiment, as shown in FIG. 6, framework layer 620 includes a job scheduler 632, a configuration manager 634, a resource manager 636 and a distributed file system 638. In at least one embodiment, framework layer 620 may include a framework to support software 632 of software layer 630 and/or one or more application(s) 642 of application layer 640. In at least one embodiment, software 632 or application(s) 642 may respectively include web-based service software or applications, such as those provided by Amazon Web Services, Google Cloud and Microsoft Azure. In at least one embodiment, framework layer 620 may be, but is not limited to, a type of free and open-source software web application framework such as Apache Spark™ (hereinafter "Spark") that may utilize distributed file system 638 for large-scale data processing (e.g., "big data"). In at least one embodiment, job scheduler 632 may include a Spark driver to facilitate scheduling of workloads supported by various layers of data center 600. In at least one embodiment, configuration manager 634 may be capable of configuring different layers such as software layer 630 and framework layer 620 including Spark and distributed file system 638 for supporting large-scale data processing. In at least one embodiment, resource manager 636 may be capable of managing clustered or grouped computing resources mapped to or allocated for support of distributed file system 638 and job scheduler 632. In at least one embodiment, clustered or grouped computing resources may include grouped computing resource 614 at data center infrastructure layer 610. In at least one embodiment, resource manager 636 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 638 of framework layer 620. one or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 638 of framework layer 620. one or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 634, resource manager 636, and resource orchestrator 612 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underutilized and/or poor performing portions of a data center.

In at least one embodiment, data center 600 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 600. In at least one embodiment, trained machine learning models corresponding to one or more neural networks may be used to infer or predict information using resources described above with respect to data center 600 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 415 are used to perform inferencing and/or training operations associated with one or more embodiments. In at least one embodiment, inference and/or training logic 415 may be used in system FIG. 6 for inferencing or predicting operations based, at least in part, on weight parameters calculated using neural network training operations, neural network functions and/or architectures, or neural network use cases described herein.

As described herein, a method, computer readable medium, and system are disclosed for training model from unlabeled multi-view data for use in three-dimensional (3D) pose estimation. In accordance with FIGS. 1-3B, an embodiment may provide a trained model for performing inferencing operations (e.g. estimating 2.5D pose) and for providing inferenced data (e.g. 2.5D pose), where the model is stored (partially or wholly) in one or both of data storage 401 and 405 in inference and/or training logic 415 as depicted in FIGS. 4A and 4B. Training and deployment of the model may be performed as depicted in FIG. 5 and described herein. Distribution of the model may be performed using one or more servers in a data center 600 as depicted in FIG. 6 and described herein.

What is claimed is:

1. A method for training a three-dimensional (3D) pose estimation model using unlabeled images, comprising:
   receiving as input a plurality of unlabeled images of a particular object each captured from a different viewpoint; and
   training a model, using the plurality of unlabeled images and without using labeled images of the particular object, for use by a process that estimates a three-dimensional (3D) pose for a given 2-dimensional (2D) image.

2. The method of claim 1, wherein the plurality of unlabeled images include images without 3D pose annotations.

3. The method of claim 1, wherein the plurality of unlabeled images are captured without calibrating camera position.

4. The method of claim 1, wherein the particular object is a human.

5. The method of claim 1, wherein the 3D pose is defined by 3D locations of joints with respect to a camera.

6. The method of claim 1, wherein the model is used by a first layer of the process that predicts 2.5 dimension (2.5D) pose for the given 2D image.

7. The method of claim 6, wherein a second layer of the process implements 3D reconstruction of the 2.5D pose to estimate the 3D pose for the given 2D image.

8. The method of claim 6, wherein the model:
   generates 2D heatmaps for each unlabeled image of the plurality of unlabeled images, and
   generates latent depth-maps for each unlabeled image of the plurality of unlabeled images.

9. The method of claim 8, further comprising:
receiving at least one labeled image, each labeled image of the at least one labeled image being of a corresponding object different than the particular object and being annotated with a 2D pose of the corresponding object, wherein the at least one labeled image is used for determining heatmap loss during the training.

10. The method of claim 8, wherein the first layer:
normalizes the 2D heatmaps to generate normalized 2D heatmaps.

11. The method of claim 10, wherein the first layer:
converts the normalized 2D heatmaps to 2D pose coordinates.

12. The method of claim 11, wherein the first layer:
obtains relative depth values from the latent depth-maps and the normalized 2D heatmaps,
wherein the relative depth values and the 2D pose coordinates define the 2.5D pose.

13. The method of claim 7, wherein the second layer:
determines a depth of a root joint, and
uses the depth of the root joint to reconstruct scale normalized 3D locations of joints using perspective projection.

14. The method of claim 13, wherein predefined average lengths for one or more aspects of the particular object are used for determining length loss associated with the scale normalized 3D locations of the joints during training.

15. The method of claim 13, wherein the second layer:
performs rigid alignment for the scale normalized 3D locations of the joints to generate the 3D pose.

16. The method of claim 15, wherein multi-view consistency loss is determined for the 3D pose during training, the multi-view consistency loss enforcing that 3D poses generated from different views should be the same up to a rigid transform.

17. A non-transitory computer-readable medium storing computer instructions that, when executed by one or more processors, cause the one or more processors to perform a method comprising:
receiving as input a plurality of unlabeled images of a particular object each captured from a different viewpoint; and
training a model, using the plurality of unlabeled images and without using labeled images of the particular object, for use by a process that estimates a three-dimensional (3D) pose for a given 2-dimensional (2D) image.

18. A system, comprising:
a memory storing computer instructions; and
a processor that executes the computer instructions to perform a method comprising:
receiving as input a plurality of unlabeled images of a particular object each captured from a different viewpoint; and
training a model, using the plurality of unlabeled images and without using labeled images of the particular object, for use by a process that estimates a three-dimensional (3D) pose for a given 2-dimensional (2D) image.

19. The system of claim 18, wherein the plurality of unlabeled images are captured without calibrating camera position.

20. The system of claim 18, wherein the plurality of unlabeled images include images without 3D pose annotations.

* * * * *